(12) United States Patent
Santo

(10) Patent No.: US 7,374,378 B2
(45) Date of Patent: May 20, 2008

(54) DUST PREVENTION MECHANISM OF SPINDLE DEVICE

(75) Inventor: Keiji Santo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/672,168

(22) Filed: Feb. 7, 2007

(65) Prior Publication Data
US 2007/0199296 A1 Aug. 30, 2007

(30) Foreign Application Priority Data
Feb. 28, 2006 (JP) .............................. 2006-053637

(51) Int. Cl.
*B23Q 11/00* (2006.01)
(52) U.S. Cl. ................. 409/137; 409/234; 409/232
(58) Field of Classification Search ............... 409/135, 409/136, 137, 230, 231, 232, 233, 234
See application file for complete search history.

(56) References Cited

U.S. PATENT DOCUMENTS

| | | | | |
|---|---|---|---|---|
| 3,698,725 A | * | 10/1972 | Klabunde | 409/231 |
| 4,822,218 A | * | 4/1989 | Satoh | 409/136 |
| 4,925,348 A | * | 5/1990 | Krusi | 409/231 |
| 5,419,661 A | * | 5/1995 | Meachum | 409/136 |
| 5,487,629 A | * | 1/1996 | Watanabe | 409/137 |
| 5,971,678 A | * | 10/1999 | Linderholm | 409/132 |
| 6,264,590 B1 | * | 7/2001 | Ferrari | 409/137 |
| 6,623,251 B2 | * | 9/2003 | Nawamoto et al. | 409/231 |
| 6,692,202 B2 | * | 2/2004 | Katsuzawa et al. | 409/135 |
| 6,830,415 B2 | * | 12/2004 | Shiba et al. | 409/131 |
| 7,112,019 B2 | * | 9/2006 | Ammann | 409/231 |

FOREIGN PATENT DOCUMENTS

JP 02-100851 A1 4/1990
JP 05-261603 A1 10/1993

\* cited by examiner

*Primary Examiner*—Dana Ross
(74) *Attorney, Agent, or Firm*—Burr & Brown

(57) ABSTRACT

A dust prevention mechanism of a spindle device that ensures prevention of cutting liquid etc. from entering an inner portion of the spindle device, which saves energy and reduces noise upon stop of rotation of a spindle is provided. In a dust prevention mechanism 1, a spindle device 2 starts operating upon a command from a controller 4. Then, a 2-port solenoid valve 7 is opened to supply a predetermined amount of compressed air into the inner portion of the spindle device 2. In contrast, the spindle stops rotating upon a command from the controller 4. The controller 4 closes the 2-port solenoid valve 7, while it opens a 2-port solenoid valve 10 in a bypass route B. The controller 4 supplies compressed air, whose amount is reduced by a diaphragm 9, into the inner portion of the spindle device 2 during a predetermined time set by a timer 8.

4 Claims, 2 Drawing Sheets

DUST PREVENTION MECHANISM OF SPINDLE DEVICE

BACKGROUND OF THE INVENTION

This application claims the benefit of Japanese Patent Application Number 2006-53637 filed on Feb. 28, 2006, the entirety of which is incorporated by reference.

1. Field of the Invention

The present invention relates to a dust prevention mechanism for preventing a state where ambient air including cutting liquid or cutting chips enters an inner portion of a spindle device which is installed in a machine tool, for example.

2. Description of the Related Art

Generally, a spindle device installed in a machine tool and so on, is used in an atmosphere where cutting liquid and cutting chips and the like are mixed. When the cutting liquid and the cutting chips and the like enter an inner portion of the spindle device (for example, a gear portion or a bearing), there are problems in the spindle device, and the life of the spindle device would be shortened. In particular, the problems are serious when a spindle of the spindle device, which is rotating in a high speed, is stopped or the rotational speed of the spindle is drastically reduced. When the spindle rotates in a high speed, air in the inner portion of the spindle device flows outside since the air expands due to the heated inner portion. In this state, upon stop of rotation of the spindle, ambient air including cutting liquid or cutting chips enters the inner portion of the spindle device during drop of the temperature of the inner portion of the spindle device. Therefore, in order to protect the spindle device from this situation, that is, to prevent the ambient air from entering the inner portion of the spindle device, dust prevention mechanisms as disclosed in patent documents 1 and 2 are devised.

[Patent document 1] Japanese patent publication of unexamined application No. 5-261603

[Patent document 2] Japanese patent publication of examined application No. 8-22494

Here, the dust prevention mechanisms disclosed in the patent documents 1 and 2 will be explained.

The dust prevention mechanism in the patent document 1 includes an air vent with a relatively large diameter defined on a spindle casing. The air vent actively allows ventilation of ambient air between the inner side and the outer side of the spindle casing, which inhibits increase of pressure in an inner portion of the spindle casing when a spindle in the spindle casing rotates in a high speed. As a result, an amount of the ambient air entering the inner portion of the spindle casing is reduced upon stop of rotation of the spindle.

The dust prevention mechanism in the patent document 2 includes a pressure detection sensor attached in an inner portion of a spindle device (for example, a labyrinth portion). In the inner portion of the spindle device, compressed fluid such as compressed air is supplied so as to maintain positive pressure.

However, since the dust prevention mechanism in the patent document 1 actively allows ventilation of ambient air between the inner side and the outer side of the spindle device, it is difficult to prevent cutting liquid or cutting chips and the like from entering the inner portion of the spindle device even though the amount of the ambient air is reduced as much as possible. Therefore, the problem that the life of the spindle device is shortened has not been resolved effectively.

The dust prevention mechanism in the patent document 2 requires the pressure detection sensor attached in the inner portion of the spindle device, and inner pressure of the spindle device has to be constantly detected to compare the inner pressure with outer pressure using the pressure detection sensor. As a result, costs of the mechanism will be increased. Furthermore, the compressed fluid is supplied regardless of a state of the spindle device, for example, rotation of a spindle of the spindle device and rotational speed of the spindle. Consequently, an excessive amount of the compressed fluid will be supplied, which is a waste of the compressed fluid.

In order to solve the above problems, the present invention is made to provide a dust prevention mechanism of a spindle device that ensures prevention of cutting liquid etc. from entering the inner portion of the spindle device, which saves energy and reduces noise upon stop of rotation of the spindle.

SUMMARY OF THE INVENTION

In order to achieve the above object, in a first aspect of the present invention, a dust prevention mechanism of a spindle device has a supply route for supplying compressed fluid into an inner portion of the spindle device and prevents ambient air including cutting liquid and cutting chips and the like from entering the inner portion of the spindle device by supplying the compressed fluid. The mechanism includes controlling means for controlling an amount of supply of the compressed fluid, wherein the controlling means supplies a smaller amount of the compressed fluid at least upon stop of rotation of a spindle of the spindle device than that of the compressed fluid supplied when the spindle is rotating.

In a second aspect of the present invention, a dust prevention mechanism of a spindle device has a supply route for supplying compressed fluid into an inner portion of the spindle device and prevents ambient air including cutting liquid and cutting chips and the like from entering the inner portion of the spindle device by supplying the compressed fluid. The mechanism includes controlling means for controlling an amount of supply of the compressed fluid and rotational speed detecting means for detecting a rotational speed of a spindle of the spindle device, wherein the controlling means controls an amount of supply of the compressed fluid in accordance with the rotational speed of the spindle.

In a third aspect of the present invention based on the first or second aspect, the dust prevention mechanism further includes a first supply route with a diaphragm for reducing an amount of supply of the compressed fluid and a second supply route having no diaphragm, wherein the controlling means switches the first supply route and the second supply route.

In the present invention, "stop of rotation" of the spindle includes a state where the spindle provided with the spindle device is not driven to rotate, as well as a state where rotation of the spindle is completely finished. Thus, as long as the spindle is not driven to rotate, this state is regarded as stop of rotation even though the spindle rotates through inertia.

According to the invention recited in the first aspect, compressed fluid is supplied into the inner portion of the spindle device even upon stop of rotation of the spindle. This ensures that ambient air, mixed with cutting liquid and cutting chips and the like, does not enter the inner portion of the spindle device. Therefore, problems related with the cutting liquid and the cutting chips and the like seldom occur in the spindle device. Furthermore, durability and stability of the spindle device is improved, which prolongs the life of the spindle device. Moreover, as there is no need of constant comparison between inner pressure and outer pressure of the spindle device, the mechanism has a relatively simple structure, and costs can be reduced. Further, since an amount of supply of the compressed fluid is reduced upon stop of rotation of the spindle, compressed fluid is not wasted. Thus, energy conservation is improved and noises resulting from supply of compressed fluid upon stop of rotation of the spindle can be reduced.

According to the invention recited in the second aspect, the mechanism includes the controlling means for controlling an amount of supply of the compressed fluid and the rotational speed detecting means for detecting a rotational speed of the spindle, which controls the amount of supply of the compressed fluid in accordance with the rotational speed of the spindle. Thus, the compressed fluid is supplied into the inner portion of the spindle device even upon stop of rotation of the spindle. This ensures that ambient air, mixed with cutting liquid and cutting chips and the like, does not enter the inner portion of the spindle device similar to the invention according to the first aspect. As a result, the life of the spindle device may be prolonged. In addition, an amount of supply of the compressed fluid can be maintained appropriately based on a rotational speed of the spindle, and thus the compressed fluid is not wasted and energy conservation is improved. Furthermore, noises can be reduced because the amount of supply of the compressed fluid is reduced upon stop of rotation of the spindle.

According to the invention recited in the third aspect, the mechanism includes the first supply route with a diaphragm for reducing an amount of supply of the compressed fluid and the second supply route having no diaphragm, wherein the controlling means switches the first supply route and the second supply route. Thus, the above-described effects can be obtained with a simple configuration, and costs can be reduced.

DETAILED DESCRIPTION OF THE PREFERRED EMBODIMENT

Hereinafter, an embodiment of a dust prevention mechanism for a spindle device in accordance with the present invention will be explained with reference to drawings.

Figure 1:
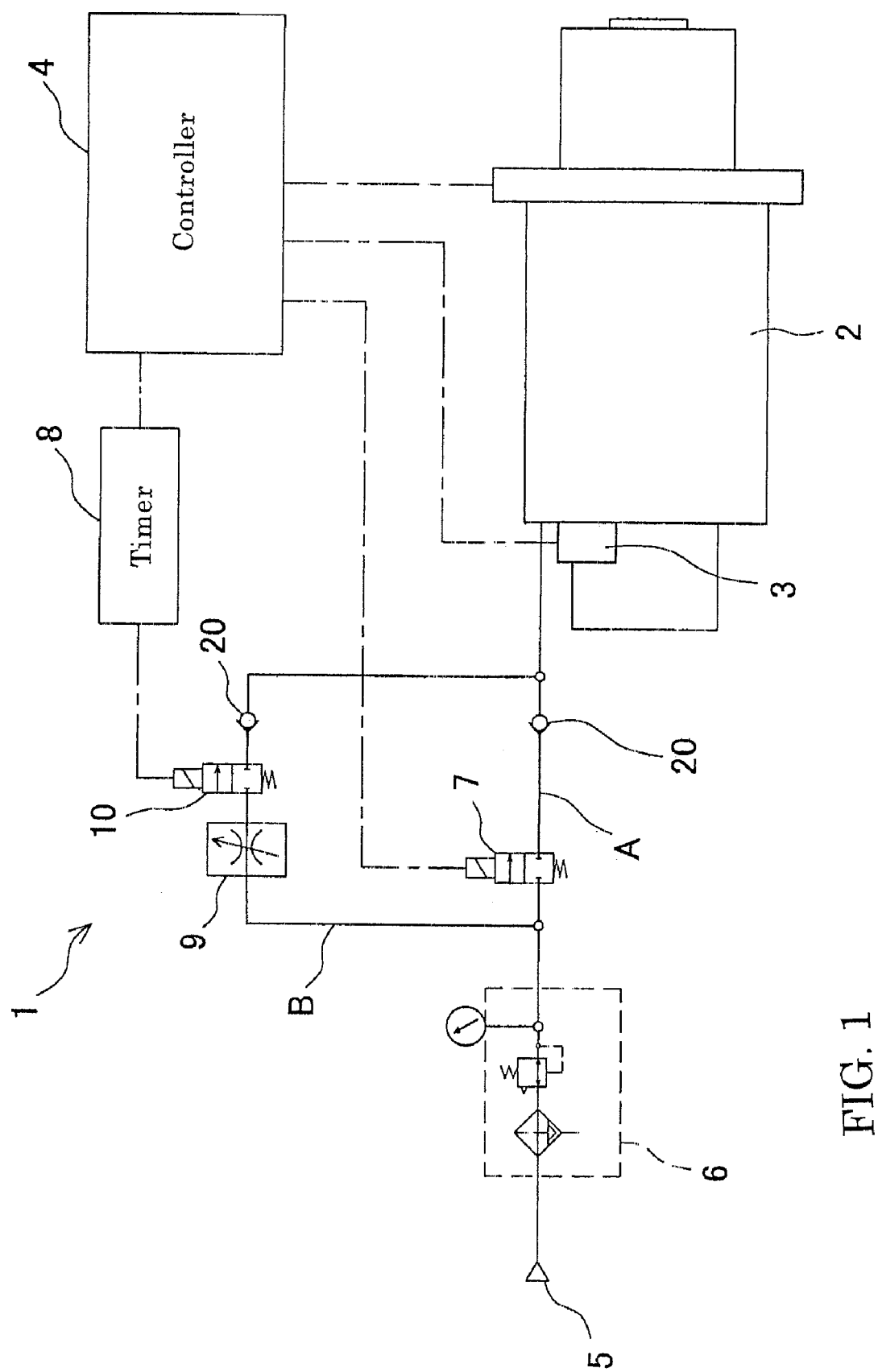
FIG. 1 is a block diagram showing a dust prevention mechanism of a spindle device.

FIG. 1 is a block diagram showing a dust prevention mechanism 1 of a spindle device 2 in accordance with the embodiment. The dust prevention mechanism 1 is a device for preventing ambient air from flowing into an inner portion of the spindle device 2. The dust prevention mechanism 1 includes a controller 4 (controlling means) for controlling rotation of a spindle of the spindle device 2 as well as supply of compressed air to be supplied into the inner portion of the spindle device 2. The spindle device 2 is installed in a machine tool (not shown) and the like and connected to an air supply source 5 for supplying the compressed air into the inner portion of the spindle device 2 via a supply route A. Moreover, the spindle device 2 includes a rotational speed detecting sensor 3 (rotational speed detecting means) for detecting a rotational speed of the spindle. The rotational speed detecting sensor 3 is connected to the controller 4 which supplies the compressed air into the inner portion of the spindle device 2 as described later based on the rotational speed detected by the rotational speed detecting sensor 3.

The supply route A includes a filter regulator 6 for regulating an air pressure and a 2-port solenoid valve 7 which is freely opened and closed under the regulation of the controller 4. The supply route A is connected to a bypass route B which bypasses the 2-port solenoid valve 7. The bypass route B includes a diaphragm 9 for reducing an amount of flow of the compressed air and a 2-port solenoid valve 10 which is freely opened and closed under the regulation of the controller 4. Additionally, the reference number 20 denotes a check valve.

In the dust prevention mechanism 1 as configured above, when the spindle device 2 starts operating, the controller 4 issues a command to start operation of the spindle device 2, and opens the 2-port solenoid valve 7 to supply a predetermined amount of compressed air (for example, 180 NL/min) into the inner portion of the spindle device 2.

In contrast, when a spindle of the spindle device 2 stops rotating, the controller 4 issues a command to stop the spindle, and the rotational speed of the spindle is detected by the rotational speed detecting sensor 3. When the rotational speed of the spindle is confirmed to be a predetermined value or lower than the same, the controller 4 closes the 2-port solenoid valve 7, while it opens the 2-port solenoid valve 10 in the bypass route B. Then, a timer 8 is set to a predetermined time (for example, 30 minutes), and the controller 4 supplies compressed air, whose amount is reduced by the diaphragm 9 (for example, 45 NL/min), into the inner portion of the spindle device 2 during the above predetermined time. The 2-port solenoid valve 10 is closed when the predetermined time has elapsed.

In the dust prevention mechanism 1 as described above, the air supply source 5 supplies compressed air into the inner portion of the spindle device 2 even upon stop of rotation of the spindle. This ensures that ambient air, mixed with cutting liquid and cutting chips and the like, does not enter the inner portion of the spindle device 2 even when the spindle device 2 is operated in an atmosphere in which the cutting liquid and the cutting chips and the like are mixed. Therefore, problems related with the cutting liquid and the cutting chips and the like seldom occur in the spindle device 2. Furthermore, as durability and stability of the spindle device 2 is improved, which prolongs the life of the spindle device 2. Moreover, as there is no need of constant comparison between inner pressure and outer pressure of the spindle device 2, the mechanism 1 has a relatively simple structure, and costs can be reduced.

Further, upon stop of rotation of the spindle, the amount of the compressed air supplied into the inner portion of the spindle device 2 is reduced using the diaphragm 9. Consequently, the compressed air is not wasted. Thus, energy conservation is improved and noises resulting from supply of compressed air upon stop of rotation of the spindle can be reduced. Additionally, in the present embodiment, when the amount of supply of the compressed air is reduced, total amount of consumption of the compressed air upon stop of rotation of the spindle is reduced to be one-fourth compared to a mechanism in which an amount of supply of the compressed air is constant.

In addition, the spindle device 2 includes the rotational speed detecting sensor 3 to detect a rotational speed, and the amount of supply of the compressed air is controlled based on the rotational speed. Therefore, even when the rotation of the spindle is improperly stopped, the compressed air can be reliably supplied into the spindle 2 without waste.

The configuration of the dust prevention mechanism for the spindle of the present invention will not be limited to the above embodiment and can be modified appropriately without departing the scope of the present invention.

Figure 2:
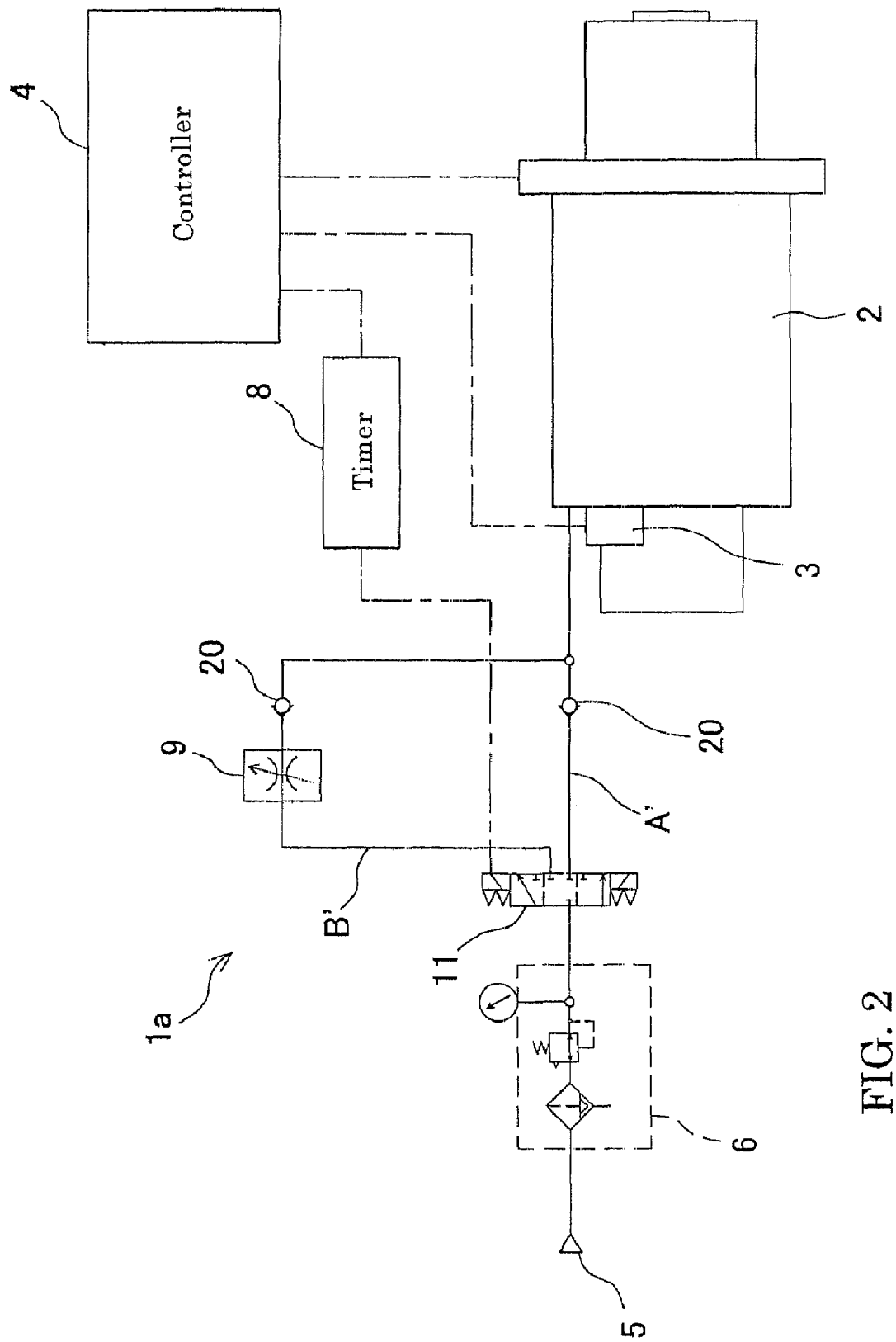
FIG. 2 is a block diagram showing a modified embodiment of a dust prevention mechanism of a spindle device.

For example, two 2-port solenoid valves are used in the above embodiment, but the configuration using a 3-port solenoid valve instead of a 2-port solenoid valve is also acceptable. Such a configuration will be explained with reference to FIG. 2. FIG. 2 is a block diagram showing a dust prevention mechanism 1a of the spindle device 2 as a modified embodiment. It should be noted that in FIG. 2, the same reference number is attached to the same component as that of the dust prevention mechanism 1.

In this dust prevention mechanism 1a, a 3-port solenoid valve 11 operated under the regulation of the controller 4 is installed on a supply route A' instead of the 2-port solenoid valve 7. In addition, the 3-port solenoid valve 11 is connected to a supply route B' having the diaphragm 9.

In this dust prevention mechanism 1a, when the spindle device 2 starts operating, the controller 4 issues a command to start operation of the spindle device 2, and switches the 3-port solenoid valve 11 to the supply route A' to supply a predetermined amount of compressed air (for example, 180 NL/min) into the inner portion of the spindle device 2.

In contrast, when the spindle of the spindle device 2 stops rotating, the controller 4 confirms that the rotational speed of the spindle is a predetermined value or lower than the same. When the above is confirmed, the controller 4 sets the timer 8 to a predetermined time, and switches the 3-port solenoid valve 11 to the supply route B' to supply compressed air, whose amount is reduced by the diaphragm 9 (for example, 45 NL/min), into the inner portion of the spindle device 2 during the above time. The 3-port solenoid valve 11 is closed when the predetermined time has elapsed.

Similarly to the dust prevention mechanism 1, in the dust prevention mechanism 1a, the cutting liquid and the cutting chips do not enter the inner portion of the spindle device 2. Moreover, the amount of supply of the compressed air is reduced upon stop of rotation of the spindle. As a result, energy conservation is improved and noise is reduced.

Further, in the dust prevention mechanism 1a, since two 2-port solenoid valves are replaced with one 3-port solenoid valve 11, several advantages can be achieved, for example, the number of parts is reduced, each procedure such as maintenance is simplified, and technical design flexibility regarding installation of the dust prevention mechanism 1a is improved.

In the above embodiment and modification, the amount of supply of the compressed fluid is reduced upon stop of rotation of the spindle. However, when a rotational speed of the spindle can be freely controlled, a configuration to switch supply routes based on a predetermined rotational speed is also acceptable. Alternatively, by applying a diaphragm device in which an aperture can be freely adjusted and connecting the device to the controller, a configuration where the aperture can be adjusted in accordance with a rotational speed can be accepted. By applying this configuration, a supply route can be a single route.

In addition, in the above embodiment and modification a supply route is switched in accordance with a rotational speed detected by the rotational speed detecting sensor. However, a configuration may be applied, where the controller switches supply routes of the compressed fluid in accordance with a command to stop the spindle. By applying this configuration, the number of components can be further reduced and costs can be saved.

Needless to say, time set by a timer, and a type or an amount of supply of compressed fluid and so on can be modified appropriately.

What is claimed is:

1. A dust prevention mechanism of a spindle device, the mechanism having a supply route for supplying compressed fluid into an inner portion of the spindle device and preventing ambient air including cutting liquid and cutting chips and the like from entering the inner portion of the spindle device by supplying the compressed fluid, the mechanism comprising:

controlling means for controlling an amount of supply of the compressed fluid, wherein the controlling means supplies a smaller amount of the compressed fluid at least upon stop of rotation of a spindle of the spindle device than that of the compressed fluid supplied when the spindle is rotating.

2. A dust prevention mechanism of a spindle device, the mechanism having a supply route for supplying compressed fluid into an inner portion of the spindle device and preventing ambient air including cutting liquid and cutting chips and the like from entering the inner portion of the spindle device by supplying the compressed fluid, the mechanism comprising:

controlling means for controlling an amount of supply of the compressed fluid; and rotational speed detecting means for detecting a rotational speed of a spindle of the spindle device, wherein the controlling means controls an amount of supply of the compressed fluid in accordance with the rotational speed of the spindle.

3. The dust prevention mechanism in accordance with claim 1, further comprising:

a first supply route with a diaphragm for reducing an amount of supply of the compressed fluid; and a second supply route having no diaphragm, wherein the controlling means switches the first supply route and the second supply route.

4. The dust prevention mechanism in accordance with claim 2, further comprising:

a first supply route with a diaphragm for reducing an amount of supply of the compressed fluid; and a second supply route having no diaphragm, wherein the controlling means switches the first supply route and the second supply route.

* * * * *